A. S. CHRISTENSEN.
CURRENT MOTOR.
APPLICATION FILED JULY 29, 1919.
1,355,386. Patented Oct. 12, 1920.
5 SHEETS—SHEET 5.
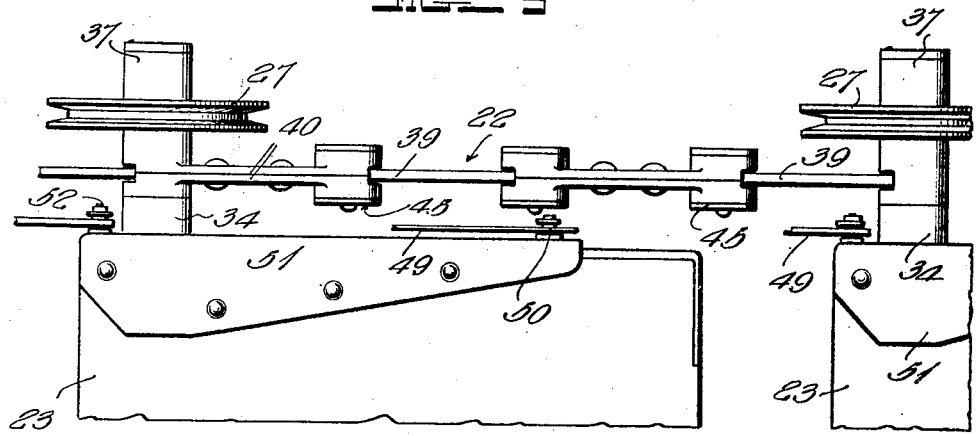
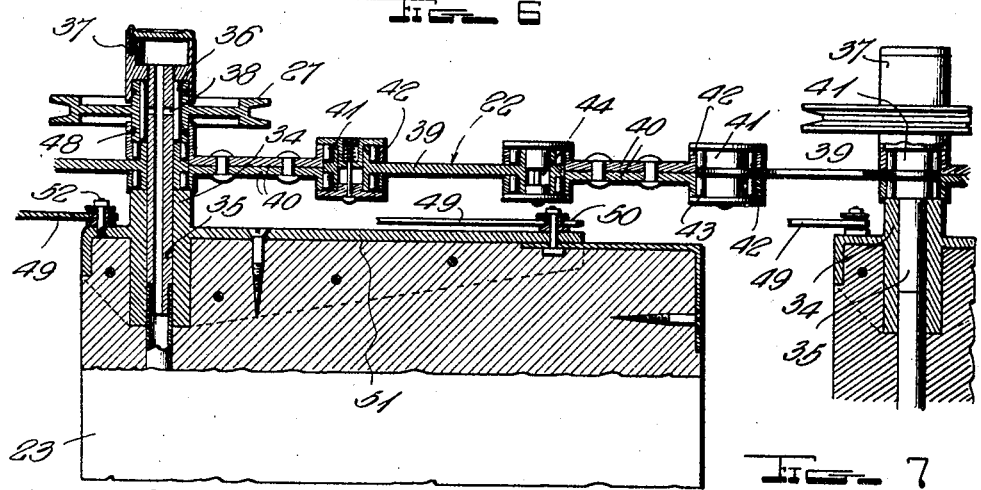
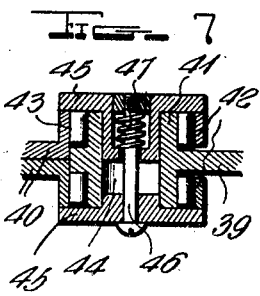
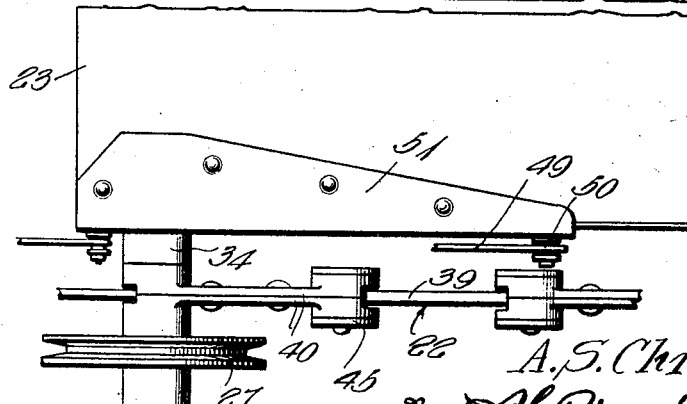
Inventor
A. S. Christensen
By H. R. Willson &co
Attorneys

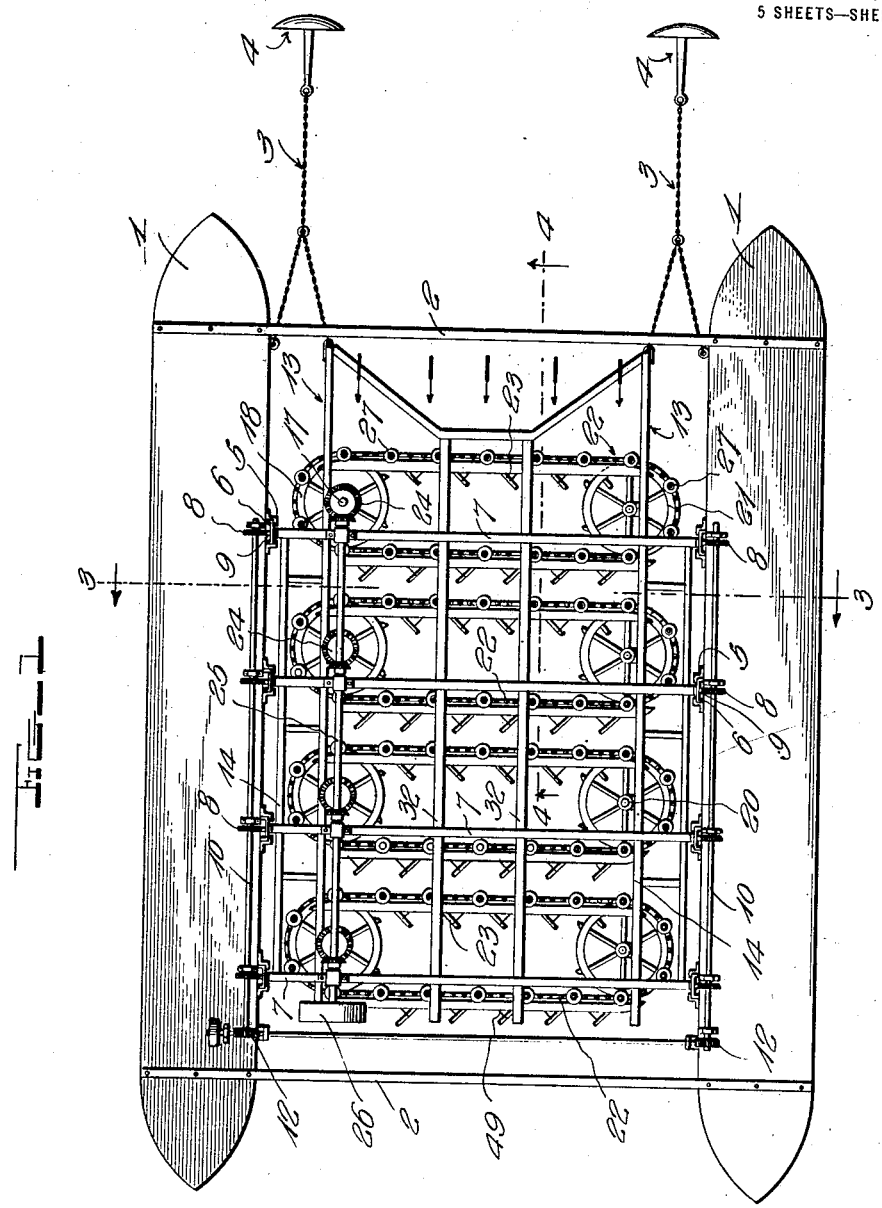

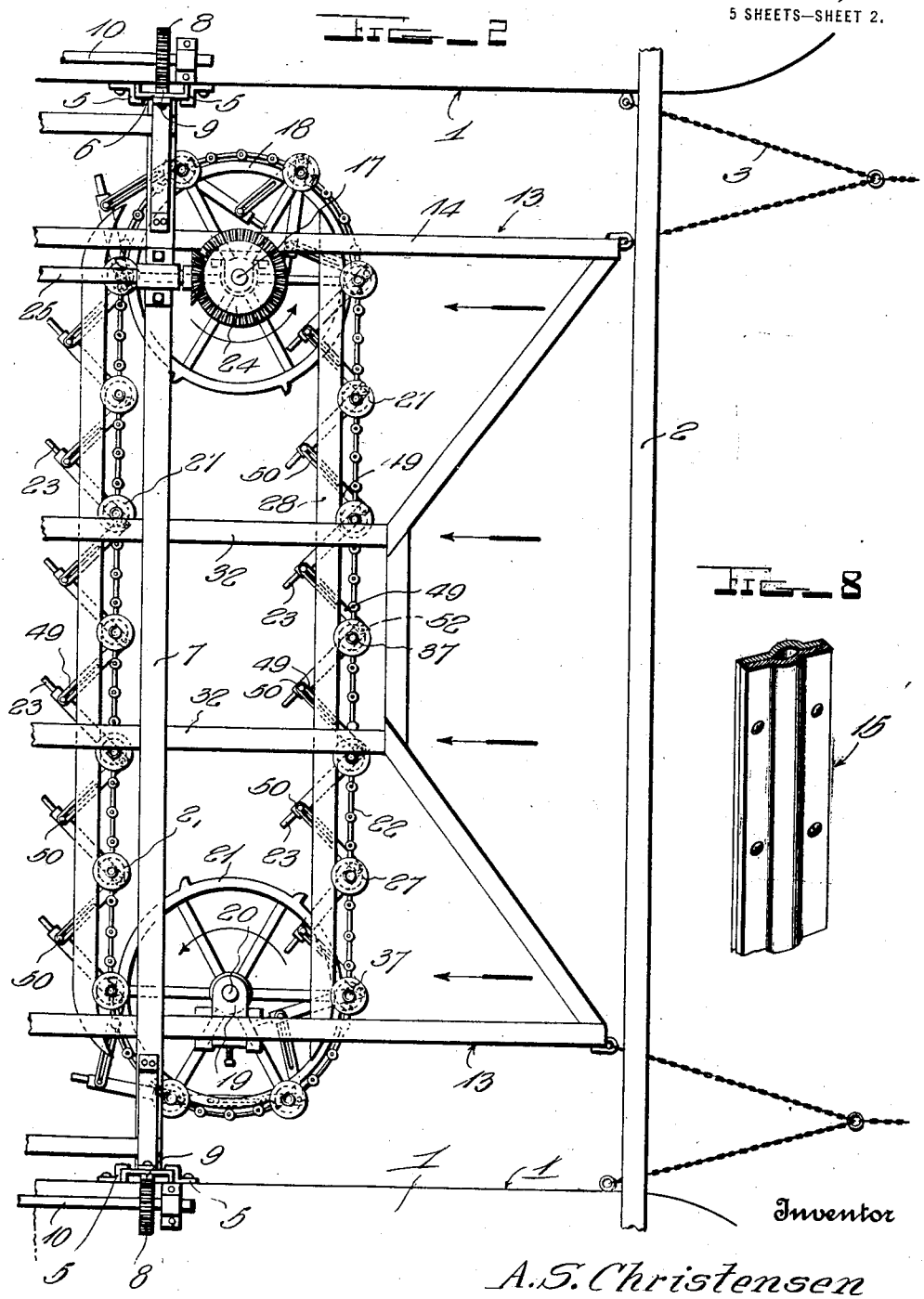

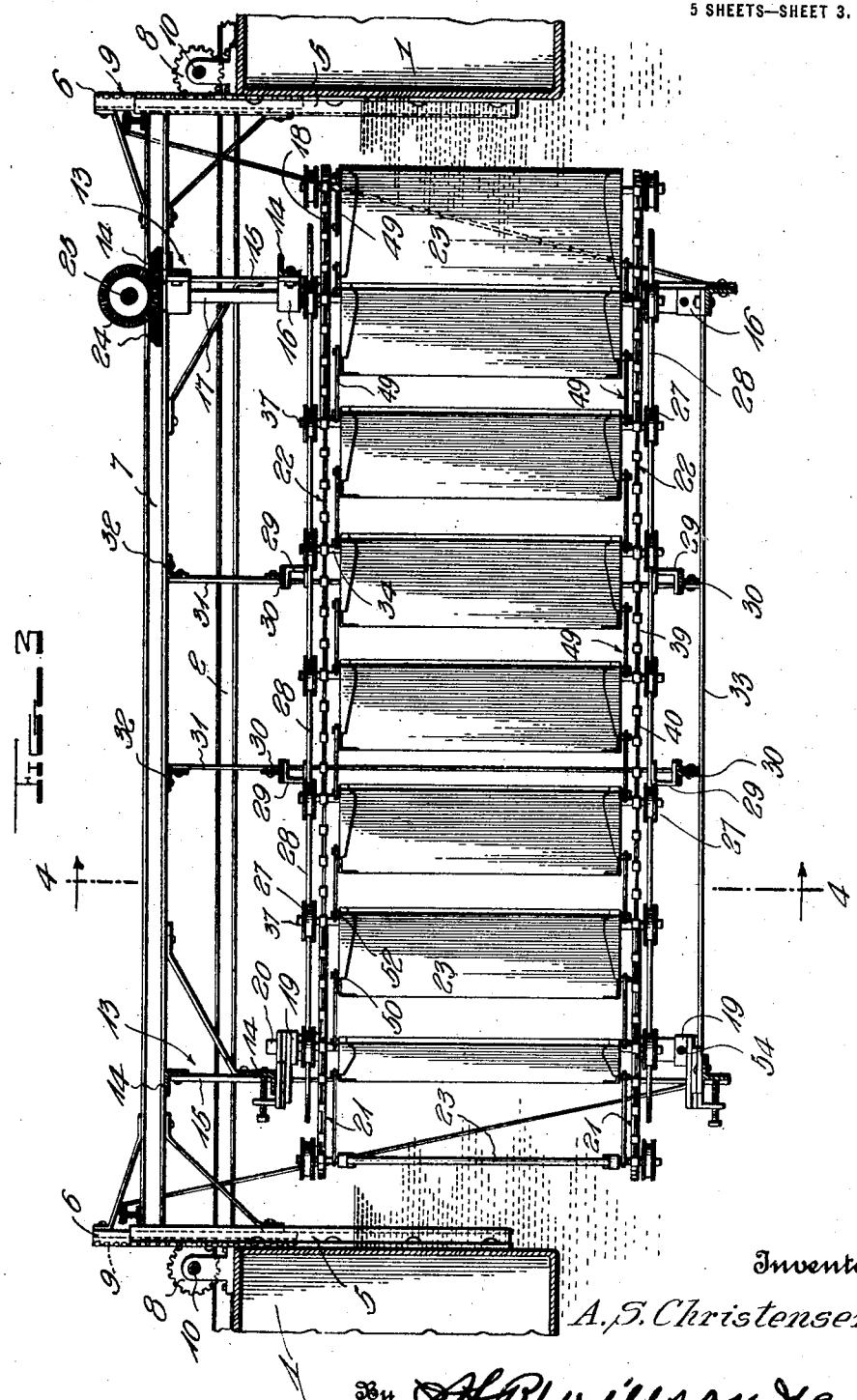

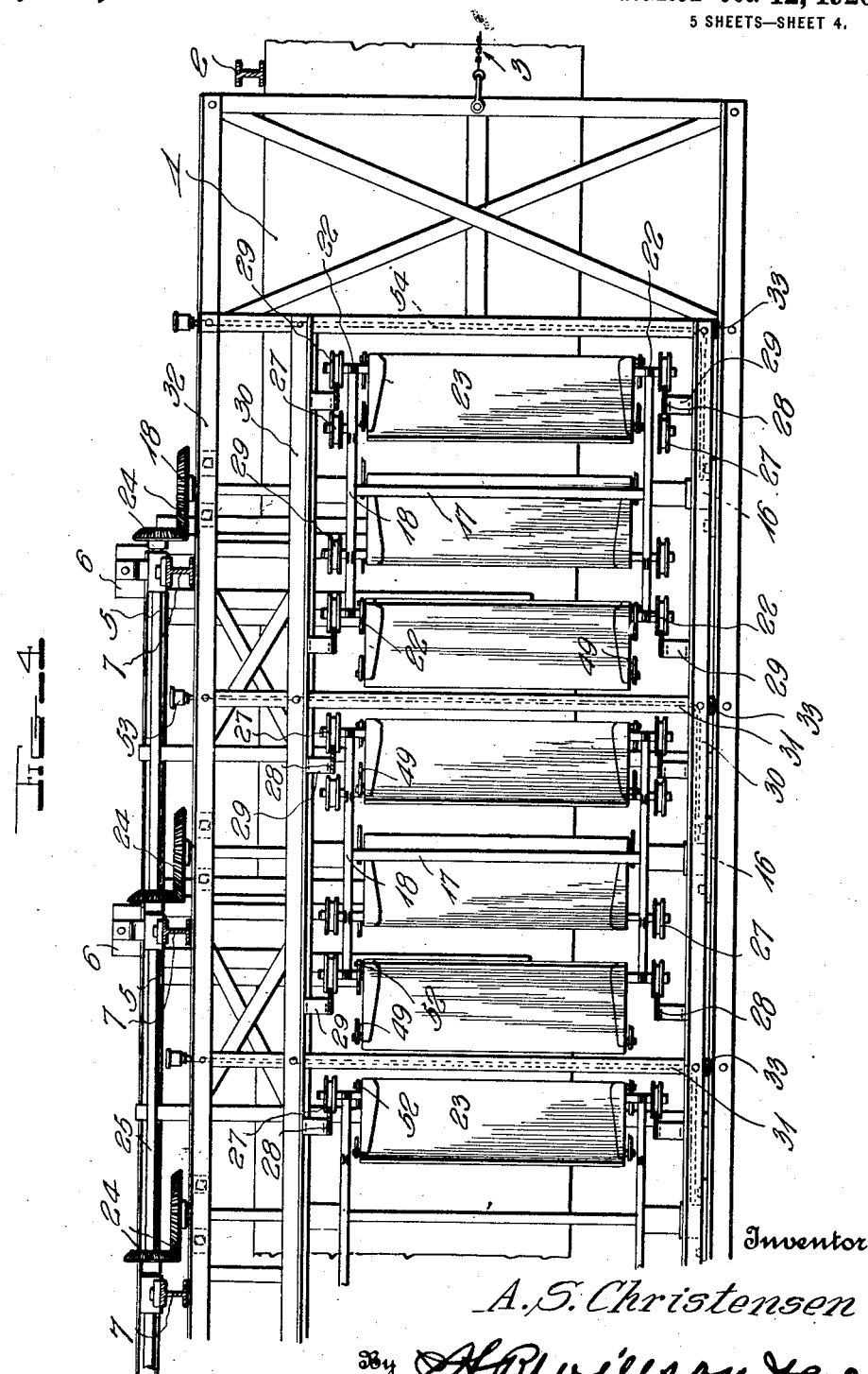

UNITED STATES PATENT OFFICE.

AUGUST S. CHRISTENSEN, OF RESERVE, MONTANA.

CURRENT-MOTOR.

1,355,386.  Specification of Letters Patent.  Patented Oct. 12, 1920.

Application filed July 29, 1919. Serial No. 313,992.

*To all whom it may concern:*

Be it known that I, AUGUST S. CHRISTENSEN, a citizen of the United States, residing at Reserve, in the county of Sheridan and State of Montana, have invented certain new and useful Improvements in Current-Motors; and I do declare the following to be a full, clear, and exact description of the invention, such as will enable others skilled in the art to which it appertains to make and use the same.

My invention has for its principal object to provide a comparatively simple and inexpensive, yet a highly efficient and durable current motor in which the strength of the current is utilized by impinging upon angular blades on both reaches of endless chains.

Another object is to provide a simple yet efficient frame structure for carrying all moving parts.

Still further objects are to provide novel means for connecting the links of the chains, for attaching the blades thereto, and for controlling the angles of said blades.

With the foregoing in view, the invention resides in the novel features of construction and unique association of parts hereinafter fully described and claimed, the descriptive matter being supplemented by the accompanying drawings which form a part of this application.

Figure 1 is a top plan view of a current motor constructed in accordance with my invention.

Fig. 2 is an enlarged plan view of one end of the motor.

Fig. 3 is a vertical transverse section on the plane indicated by the line 3—3 of Fig. 1.

Fig. 4 is a longitudinal section on the plane indicated by the lines 4—4 of Figs. 1 and 3.

Fig. 5 is an enlarged elevation showing the upper ends of two of the pivoted blades and associated parts.

Fig. 6 is a side elevation partly in section showing both the upper and lower ends of one of the pivoted blades and illustrating the construction of the endless chains carrying said blades.

Fig. 7 is a detail section of one of the chain joints.

Fig. 8 is a sectional perspective showing the construction of the vertical frame bars which extend into the water.

In the drawings above briefly described, the numerals 1 designate a pair of parallel pontoons which are shown connected by a pair of transverse bars 2, chain 3 and anchors 4 being shown for anchoring said pontoons, although they could be held by any preferred means. The inner sides of the pontoons 1 are provided with longitudinally spaced vertical guides 5 in which vertical bars 6 are slidably mounted, the upper ends of said bars 6 being connected by transverse crown bars 7 which extend between the two pontoons 1. All moving parts of the motor are suspended from the crown bars 7 and in order that the propelling blades may extend at any required distance below the surface, I provide means for adjusting the bars 6 and 7 vertically. This means could be in any suitable form, but I preferably provide gears 8 and rack teeth 9, said rack teeth being carried by the bars 6 while the gears 8 are secured on longitudinal shafts 10. These shafts extend longitudinally of the pontoons 1 and may be driven in unison by a transverse shaft 11 having suitable connection therewith (see Fig. 1). Worms and worm gears 12 are preferably employed for this purpose in order that the several parts will remain in the positions to which they are adjusted.

Two parallel, vertical, side frames 13 extend longitudinally between the pontoons 1 and are secured to the ends of the bars 7, said frames including suitable longitudinal bars 14 and vertical bars 15 extending therebetween, and said bars 15, as well as all other bars which extend into the water, are by preference of the construction shown in Fig. 8. This construction is light and yet at the same time is rigid and will not materially retard the current of water. Mounted on certain of the bars 14 of one of the frames 13 are fixed vertically alined bearings 16 in which vertical shafts 17 are mounted, said shafts having sprocket wheels 18. Directly opposite the bearings 16, the outer frame 13 is provided with bearings 19 adjustable toward and away from said bearings 16 and carrying vertical shafts 20, these shafts being provided with sprockets 21. A plurality of endless chains 22 extend transversely between the pontoons 1 and are trained around the opposed wheels 18 and 21, said chains carrying the pivoted paddles 23 upon which the current impinges, thereby driving the chains. The vertical shafts 17 are thus driven and by means of suitable gearing 24, said shafts in turn drive a longitudinal shaft 25 from which power may be taken by a pulley 26 or any other preferred means. At intervals, the chains 22 are provided with rollers 27 which travel along transverse tracks 28 to prevent bowing of the two reaches of the chains, and these tracks are preferably secured by brackets 29 to longitudinal bars 30 which are in turn secured to vertical bars 31 depending from longitudinal beams 32, said beams being secured to the crown bars 7. The lower ends of the bars 31 may well be secured to transverse bars 33 which connect the lower edges of the side frames 13.

At their upper and lower ends, near one vertical edge, the blades 23 are provided with vertical bearings 34 through which tubular vertical shafts 35 extend, the grooved rollers 27 being mounted rotatably on the upper and lower ends of said shafts. Roller bearings 36 are preferably provided for the rollers 27 and in order that these bearings may be effectively lubricated, I provide the upper ends of the shafts with oil cups 37 from which oil may flow through the tubular shaft 35 which is provided with oil ports 38 leading to the bearings as seen in Fig. 6. The chains 22 are located between the rollers 27 and the ends of the blades 23 and said chains are preferably of the novel construction shown in Figs. 5, 6 and 7.

Each chain 22 comprises one piece links 39 disposed at spaced intervals, and two part links 40 connecting them, the ends of each link 39 having oppositely projecting cylindrical bosses 41 while the upper and lower halves of the two part links 40 are provided with bearing rings 42 receiving said bosses, roller bearings 43 being by preference interposed between the two. The ends of the links 39 are shown provided with transverse bores 44 extending through the bosses 41, and it is possible that said bores may be utilized for containing grease to lubricate the joints of the chains, and to exclude any foreign matter from these joints, end plates 45 may contact with the rings 42 and the bosses 41, any preferred means being employed for securing said end plates in place. I prefer, however, to provide bolts 46 and springs 47 for this purpose as detailed in Fig. 7.

By constructing the chains in the manner shown, they may be easily manufactured and assembled, will be highly efficient in use, and may be easily repaired whenever necessary. Furthermore by reference to Fig. 6, it will be seen that certain of the transverse bores 44 receive the ends of the vertical shafts 35, thus forming effective means for attaching the blades 23 to the chains 22, and if desired, the hubs of the rollers 27 may interfit in a fluid-tight manner with the joints of the chains as indicated at 48 in Fig. 6.

For controlling the angular relation of the blades 23 with the two reaches of the chains 22, I provide a plurality of one piece links 49 connecting the pivoted edges of the several blades with the free edges of the adjacent blades. These links have a slot and pin connection 50 with the blades in order that the latter may be reversed by the action of the current as they travel from one reach of the chain to the other (see Fig. 2). By this arrangement, it is insured that the blades 23 shall always be positioned at the sides of the chains remote from the source of the current and thus such current will act upon the blades of both reaches of the chains, to produce maximum efficiency.

If desired, the upper and lower ends of the blades 23 may be bound with channel irons 51 and these irons may well be formed integrally with the bearings 34 as seen clearly in Fig. 6, the connections 50 of the links 49 being located at one end of the channel irons 51, while the pivots 52 of said links are carried by the other ends thereof.

In addition to the provision above described for lubricating, I will provide suitable means for oiling all moving parts, and as typical of one manner of lubrication, I have shown grease cups 53 and suitable ports 54 for lubricating the bearings 16 and 19. The method of lubrication is unimportant except that it should be efficient, and need not be described further.

In operation, the machine is suitably anchored and the frame structure adjusted vertically by means of the shafts 10 and 11, so that the blades 23 may be projected the desired distance into the water, and the force of the current striking these blades, propels the chains 22 to drive the shafts 17, from which shafts power may be taken in any preferred manner, as by the shaft 25 and pulley 26. This power may be utilized in numerous ways, for instance, by mounting an electric generator on the pontoons, driving such generator by the improved current motor and carrying the current through either submerged or elevated wiring, to the points at which it is to be utilized.

From the foregoing, it will be seen that I have provided a very simple and comparatively inexpensive current motor, yet one which will be highly efficient and in every way desirable. Since probably the best results may be obtained from the details disclosed, they may well be followed, but within the scope of the invention as claimed, numerous minor changes may well be made.

I claim:

1. In a current motor, a pair of spaced, parallel supports, transverse horizontal bars extending between said supports, a pair of parallel vertical side frames depending from said bars, opposed vertical shafts mounted on said side frames and having upper and lower sprockets, upper and lower endless chains extending between said frames and trained around said sprockets, vertical blades pivoted at one edge to said chains, and means for limiting the angle between said chains and blades without interfering with free pivotal movement thereof as they pass from one reach of the chains to the other.

2. In a current motor, a pair of spaced, parallel supports, vertical guides secured to said supports, vertical bars slidable in said guides, means for adjusting said vertical bars, transverse crown bars extending between and secured to the upper ends of said vertical bars, a pair of parallel vertical side frames depending from and secured to said transverse bars, opposed vertical shafts mounted on said side frames and having upper and lower sprockets, upper and lower endless chains extending from said frames and trained around said sprockets, vertical blades pivoted at one edge to said chains, and means for limiting the angle between said chains and blades without interfering with free pivotal movement thereof as they pass from one reach of the chains to the other.

3. In a current motor, upper and lower endless chains and wheels around which they pass, said chains having openings alined vertically, vertical shafts passing through said openings and extending beyond said chains, vertical blades, metal plates reinforcing the ends of said blades and having integral bearings near one edge thereof, links pivoted at one end to one end of said metal plates with their other ends extending over the other ends of adjacent plates and provided with slots, and means passing through the slots of said links for connecting the latter pivotally and slidably to said plates.

4. In a current motor, endless chains each formed of spaced one piece links having oppositely extending bosses on their ends, and two part links connecting said one piece links and having bearing rings surrounding said bosses, said one piece links having openings extending through said bosses, shafts extending between said chains and projecting through said openings, blades mounted on said shafts between said chains, and rollers on the ends of said shafts.

In testimony whereof I have hereunto set my hand.

AUGUST S. CHRISTENSEN.